(12) United States Patent
Meyer et al.

(10) Patent No.: US 6,962,557 B2
(45) Date of Patent: Nov. 8, 2005

(54) DEVICE FOR WELDING PLASTIC FILMS

(75) Inventors: Armin Meyer, Köln (DE); Jakob Schneider, Niederkassel (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 0 days.

(21) Appl. No.: 10/491,473

(22) PCT Filed: Sep. 11, 2002

(86) PCT No.: PCT/EP02/10177
§ 371 (c)(1),
(2), (4) Date: Mar. 30, 2004

(87) PCT Pub. No.: WO03/035372
PCT Pub. Date: May 1, 2003

(65) Prior Publication Data
US 2004/0254053 A1 Dec. 16, 2004

(30) Foreign Application Priority Data
Oct. 23, 2001 (DE) .......................... 101 51 576

(51) Int. Cl.⁷ ................................................ B31B 1/64
(52) U.S. Cl. .................. 493/186; 493/197; 493/208
(58) Field of Search .................. 53/373.7, 371.8, 53/371.2, 374.2, 374.8; 100/306, 313, 330, 156, 160; 493/197, 208, 209; 156/555, 582, 583.1, 583.5; 219/633, 654, 659, 765

(56) References Cited
U.S. PATENT DOCUMENTS

| | | | | | |
|---|---|---|---|---|---|
| 3,524,783 A | * | 8/1970 | Sutherland | .................. | 156/251 |
| 3,948,215 A | * | 4/1976 | Namiki | .................. | 118/60 |
| 3,965,653 A | * | 6/1976 | Lerner | .................. | 53/570 |
| 3,966,524 A | * | 6/1976 | Lehmacher | .................. | 156/182 |
| 4,302,276 A | * | 11/1981 | Schulze | .................. | 156/553 |
| 4,573,955 A | * | 3/1986 | Mory et al. | .................. | 493/204 |
| 4,673,284 A | * | 6/1987 | Matsumoto et al. | .................. | 399/344 |
| 4,863,419 A | * | 9/1989 | Sansone | .................. | 474/237 |
| 4,981,006 A | * | 1/1991 | Caenazzo et al. | .................. | 53/387.3 |
| 4,996,554 A | * | 2/1991 | Kiyoharu | .................. | 355/406 |
| 5,051,784 A | * | 9/1991 | Yamamoto et al. | .................. | 399/329 |
| 5,164,777 A | * | 11/1992 | Agarwal et al. | .................. | 399/165 |
| 5,468,333 A | * | 11/1995 | Mundus et al. | .................. | 156/537 |
| 5,512,729 A | * | 4/1996 | Kusaka et al. | .................. | 219/216 |
| 5,672,235 A | * | 9/1997 | Blaser et al. | .................. | 156/497 |
| 5,737,679 A | * | 4/1998 | Uehara et al. | .................. | 399/329 |
| 5,785,794 A | * | 7/1998 | Fiedler | .................. | 156/290 |
| 5,927,189 A | * | 7/1999 | Jones et al. | .................. | 101/23 |
| 5,946,884 A | * | 9/1999 | Nordstrom et al. | .................. | 53/225 |
| 5,970,270 A | * | 10/1999 | De Roeck | .................. | 396/612 |
| 6,234,944 B1 | * | 5/2001 | Anderson et al. | .................. | 493/210 |
| 6,269,236 B1 | * | 7/2001 | Mori et al. | .................. | 399/354 |
| 6,338,376 B1 | * | 1/2002 | Meyer | .................. | 156/553 |
| 6,435,246 B1 | * | 8/2002 | Kerr | .................. | 156/553 |

* cited by examiner

Primary Examiner—Stephen F. Gerrity
Assistant Examiner—Hemant M. Desai
(74) Attorney, Agent, or Firm—Herbert Dubno

(57) ABSTRACT

Devices for cross-welding or cross-separating welding plastic films (2) are used in a manner known per se in machines for producing bags, said devices comprising a welding roller (3) and a heated welder terminal (4) which can be moved reciprocally and between which the plastic films (2) are guided for welding. According to the invention, the welding roller (3) is covered by a continuous belt (5).

10 Claims, 1 Drawing Sheet

DEVICE FOR WELDING PLASTIC FILMS

CROSS REFERENCE TO RELATED APPLICATION

This application is a national stage of PCT/EP02/10177 filed 11 Sep. 2002 and based upon German application 101 51 576.6 filed 23 Oct. 2001 under the International Convention.

TECHNICAL FIELD

The invention relates to a device for cross-welding or cross-separation-welding in the production of bags, pouches and the like from plastic film on a bag-making machine.

STATE OF THE ART

It is known in practice to provide machines for the transverse welding or cross-welding of plastic film or for the transverse separation welding or cross-separation-welding of plastic films. In these cases at least two superposed horizontal film layers are welded together. While this can apply as well to a single film which is folded in a longitudinal direction and thus lies doubled up, in the following description, at least two plastic films will always be referred to.

Note further that additional film layers can be welded during the welding operation so that three film layers or more can lie one above another during a welding process.

When the weld seam is to extend transversely to the travel direction of the plastic film, one can speak of transverse welding or cross-welding. When the cross-welding occurs simultaneously with separation of bag or a pouch from the remainder of the film, in this weld process, one is dealing with a transverse separation welding or cross-separation-welding.

In the publication DE 19 10 598 A1, a cross-welding, especially a cross-separation-welding is described. The welding device is comprised basically of a heated welding beam and a welding roll or drum. The films to be welded are disposed between the welding drum or roll and the welding beam. For welding, the welding beam is pressed against the welding roll. The welding roll is preferably rubber jacketed.

Since in the welding of plastic film the heated plastic can adhere to the welding roll and the welded bag and/or the welded plastic film can remain hanging on the welding roll, the fabrication process can be disturbed. For that reason, the welding roll is coated on its surface with PTFE (Teflon) polytetrafluoroethylene. The PTFE has not only good slidability properties but also a limited adhesion. For that reason only no plastics remain adherent to the PTFE even if they are heated by welding.

As the heated welding beam is lowered onto the plastic foils during the welding process, its welding edge presses somewhat into the PTFE coating and into the rubber jacket lying therebelow and which, for example, is composed of a silicone. When the welding beam is withdrawn after the welding process again from the welding rolls, the rubber jacket and the PTFE coating spring back. It has however been found that with the passage of time the PTFE coating can develop folds. The result is a reduction in the quality of the weld seams and a reduction in the life of the welding beam. Because of the fold formation in the PTFE, the PTFE covering which is adhesively bonded to the jacket becomes loose and must be replaced by a new one. This gives rise to production interruptions which are associated with cost.

OBJECT OF THE INVENTION

It is therefore an object of the invention to provide a device for cross-welding or for cross-separation-welding which avoids the drawbacks of the state of the art or reduces them.

SUMMARY OF THE INVENTION

According to the invention no backing which ensheaths the welding roll is required on the welding roll but a continuously traveling belt rests upon the welding roll. It has been found that in this way the fold formation can be reduced and the quality of the weld seams improved.

Additionally it is advantageous that the belt according to the invention does not have to be replaced as often as with the ensheathing backing or jacket with the state of the art.

It is advantageous when the belt is composed at least is on its outer surface of PTFE (Teflon). In this manner the heated plastic is readily released or does not adhere to the belt initially.

Since the welding roll on its outer diameter has a rubber/silicone jacket and exactly this outer surface contributes to stiffness, the welding roll may have insufficient bending strength especially when it is required to span large working widths. The inner metallic core of the weld roll is then not able to provide support with sufficient bend stiffness. The welding pressure of the welding beam upon the welding roll can then produce a nonparallel welding gap. In an advantageous configuration of the invention, the welding roll is supported by a bracing roll along its side opposite the press gap. In this manner a possible bending of the welding roll is counteracted.

The welding roll and the bracing roll are journaled at their ends in bearing plates and guided therein so that these bearing plates will always maintain a defined parallel position with respect to one another by means of a traverse. The traverse extends through the loop of the belt which is advantageous since it utilizes the space available in the loop.

An advantageous refinement of the invention is also the arrangement of a bracing or backup roll in the loop of the belt whereby the bracing roll is arranged substantially parallel to the welding roll, i.e. the rolls can have parallel axes. This bracing roll holds the belt taut so that no folds or irregularities can be formed in the belt. In addition, the belt is reliably guided by the bracing roll. In order to hold the belt taut, even with an increase in its length in the peripheral direction, it is advantageous for the bracing roll to be spring-loaded.

BRIEF DESCRIPTION OF THE DRAWING

The invention is described below in greater detail based upon FIG. 1. It shows.

MODE OF CARRYING OUT THE INVENTION

Figure 1:
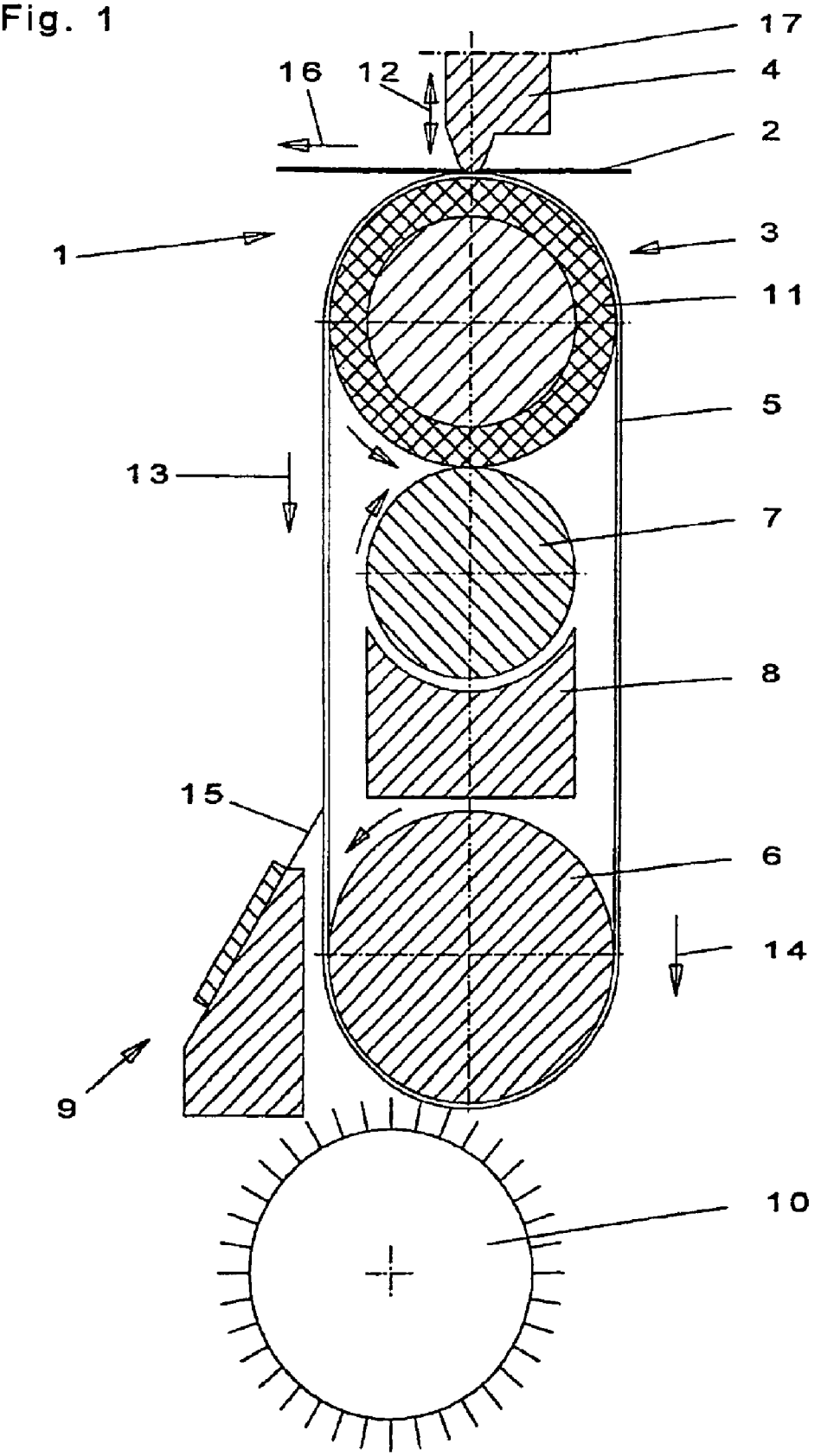
FIG. 1 a cross section through a welding tool.

In FIG. 1 a welding tool 1 can be seen for the cross welding or cross separation welding. A welding beam 4 (broken away at 17) and a welding roll 3 are the significant components of the welding device 1. During the welding, plastic foils are engaged between them. In the embodiment shown the welding beam has a movement 12 from top to bottom and the reverse. In another configuration of the invention, the welding roll 3 can also be moved against the welding beam 4.

According to the invention, the welding roll 3 is looped by a belt 5. The belt 5 lies upon a silicone jacket 11 of the welding roll 3.

The belt 5 is endless and is formed without abutting edges and constitutes therefore an endless loop. For guiding and tensioning the belt 5, within the loop a pair of tensioning rollers 6 are provided in parallel-axis relationship in the loop. Preferably a belt of PTFE (Teflon) which has been reinforced with fibers or with a fabric of glass or aramid, is used.

To brace the welding roll 3, a backing roll 7 is disposed along its side opposite that provided with the welding beam 4 and which rolls in the opposite rotational sense against the welding roll 3. The backup or bracing roll 7 is journaled in bearing plates, not shown here, like the welding roll 3 and the belt-tension rolls 6. With a predetermined pressing of the backup or bracing roll 7 against the welding roll 3, it can be ensured that the welding gap will remain parallel during the pressing of the welding beam against the welding roll 3.

Within the loop of the belt 5 a traverse 8 is also disposed. This traverse 8 interconnects the bearing plates which have here not been shown. To enable the traverse 8 to provide as much stiffness as possible, the right upper corner and the left upper corner of the traverse 8 are extended upwardly. To increase the stiffness of the traverse 8 it is also conceivable to extend the left lower and the right lower corners downwardly.

In the welding of plastic film, plastic residues can remain suspended from the belt 5. For this reason a wiper is provided in the form of a wiping blade 15 forming part of a wiper arrangement 9 juxtaposed with the belt 5. The wiper blade 15 contacts the belt 5 in an unsupported region so that the belt 5 can yield under the pressing force of the wiper blade 15.

Since the belt 5 can yield in the peripheral direction under the mechanical and/or thermal stresses, the belt 5 is tensioned by means of a tension roller 6. It is advantageous to spring-load the bearings of the tension roller 6, for example by a coil spring or a pneumatic cylinder. In that case a manual adjustment of the tension roller 6 by service personnel is rendered superfluous.

In FIG. 1 the belt 5 has a brush device 10 juxtaposed therewith. This brush device 10 is formed as a brush roller. By rotation of the brush roller possibly adhering plastic residues can be better removed from the surface of the belt 5 than when the brush arrangement 10 is only a stationary brush element.

What is claimed is:

1. An apparatus for cross welding or cross separation welding of plastic film for a machine for making bags and pouches, comprising:

a welding beam; and a support roller juxtaposed with the welding beam for supporting the plastic film for welding by said beam as said film passes between said roller and said beam, said roller and said beam being movable relative to one another for welding said film;

a jacket of silicone on said roller; and an endless belt of a synthetic resin material passing around said roller and interposed between said jacket and said film.

2. The apparatus according to claim 1 at least an outermost surface of the belt is composed of polytetrafluoroethylene.

3. The apparatus according to claim 2 wherein the belt is made of polytetrafluoroethylene reinforced with fibers or fabric of glass or aramid.

4. The apparatus according to claim 1 wherein the roller is supported on a side opposite the welding beam by a packing roller.

5. The apparatus according to claim 1 characterized in that a transverse passes through a loop formed by a belt.

6. The apparatus according to claim 1, further comprising a stripper wiper bearing against an outer surface of the belt.

7. The apparatus according to claim 1 wherein the belt also passes around a tension roller.

8. The apparatus according to claim 7 wherein the tension roller is spring loaded.

9. The apparatus according to claim 1 wherein a brush arrangement is juxtaposed with the belt.

10. The apparatus according to claim 9 wherein the brush arrangement is configured as a rotating brush roller.

\* \* \* \* \*